US 11,397,586 B1

(12) United States Patent
Becker

(10) Patent No.: US 11,397,586 B1
(45) Date of Patent: *Jul. 26, 2022

(54) UNIFIED AND COMPRESSED STATISTICAL ANALYSIS DATA

(71) Applicant: United Services Automobile Association (USAA), San Antonio, TX (US)

(72) Inventor: Glen Alan Becker, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/012,568

(22) Filed: Sep. 4, 2020

Related U.S. Application Data

(63) Continuation of application No. 15/596,827, filed on May 16, 2017, now Pat. No. 10,769,145.

(60) Provisional application No. 62/337,683, filed on May 17, 2016.

(51) Int. Cl.
| | | |
|---|---|---|
| *G06F 16/30* | (2019.01) | |
| *G06F 9/38* | (2018.01) | |
| *G06F 9/4401* | (2018.01) | |

(52) U.S. Cl.
CPC .......... *G06F 9/3895* (2013.01); *G06F 9/3836* (2013.01); *G06F 9/3877* (2013.01); *G06F 9/442* (2013.01)

(58) Field of Classification Search
CPC . G06F 16/2477; G06F 16/1748; G06F 16/184
USPC ........ 707/609, 687, 705, 769, 790, 813, 821
See application file for complete search history.

(56) References Cited

U.S. PATENT DOCUMENTS

| | | | |
|---|---|---|---|
| 10,305,758 B1* | 5/2019 | Bhide | ................... H04L 41/147 |
| 2004/0156550 A1* | 8/2004 | Govindaswamy | ... H04N 19/176 |
| | | | 375/E7.176 |
| 2007/0244987 A1* | 10/2007 | Pedersen | ............. H04L 67/2842 |
| | | | 709/217 |
| 2010/0046424 A1* | 2/2010 | Lunter | .............. H04W 28/0289 |
| | | | 370/328 |
| 2013/0290388 A1* | 10/2013 | Lenox | ................. G06F 12/0848 |
| | | | 707/827 |
| 2013/0318051 A1* | 11/2013 | Kumar | ................. G06F 16/137 |
| | | | 707/692 |

* cited by examiner

*Primary Examiner* — Sana A Al-Hashemi
(74) *Attorney, Agent, or Firm* — Fletcher Yoder, P.C.

(57) ABSTRACT

Systems and methods for compression and/or unification of statistical analysis system (SAS) data is provided. In one embodiment, a request to open a unified and compressed statistical analysis system (SAS) view file is received. The unified and compressed SAS data step view file including: an SAS data step view; compressed payload data to be used in the SAS data step view when decompressed; and a set of metadata describing characteristics of variables of the SAS data step view. Upon receiving the request, the compressed payload data is automatically decompressed, such that compressed payload data is decompressed and usable with the SAS data step view to render the SAS data step view and decompressed payload data on an electronic display of a client or host providing the request.

20 Claims, 5 Drawing Sheets

UNIFIED AND COMPRESSED STATISTICAL ANALYSIS DATA

CROSS-REFERENCE TO RELATED APPLICATION

This application is a continuation of U.S. patent application Ser. No. 15/596,827, entitled "UNIFIED AND COMPRESSED STATISTICAL ANALYSIS DATA," filed on May 16, 2017, which claims the benefit of U.S. Provisional Application No. 62/337,683, entitled "UNIFIED AND COMPRESSED STATISTICAL ANALYSIS DATA," filed May 17, 2016, each of which is hereby incorporated by reference in its entirety for all purposes.

BACKGROUND

The present disclosure relates generally to enterprise data handling. More specifically, the present disclosure relates to generation and storage of bulk data in a unified and compressed form. For example, in one embodiment, statistical analysis system data may be unified and compressed for ease of storage and/or access.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Generally speaking, embodiments provided herein relate to systems and methods for creating, storing, and/or using bulk data (such as statistical analysis system data) in an efficient manner. While the following discussion will refer to statistical analysis system (SAS) data, the current approaches could be used with any bulk data, especially bulk data where processing the data relates to reading data tables in their entirety, such as bulk data associated with analytical and reporting processes. In certain embodiments, a statistical analysis system (SAS®) data step view (e.g., a compiled machine language program) may be associated with compressed payload data that may be self-extracting upon opening the SAS® data step view with the SAS® software. The SAS® data step view may appear to a user as a data source. However, it is actually an executable program that transparently renders data as it is read. Compressed data may appear to be in a table of rows and columns. SAS® data step views typically transform data from external sources. However, by appending payload data to SAS® data step view, local payload data may be transformed into meaningful formatted data by the SAS® data step view.

Additionally and/or alternatively, metadata may be captured that may enable non-SAS-specific (e.g., "generic") hosts and/or clients to re-create bulk data in a manner interpretable by the non-SAS® specific hosts.

Accordingly, the techniques and systems provided herein may greatly improve operation of computer systems, such as systems designed to render data for analytical purposes (e.g., systems executing Statistical Analysis System (SAS®) data step views, data hosts, general purpose computers, etc. In some embodiments, parallel compression and/or decompression of portions of the data may positively impact processing time for the compression and/or decompression processes. For example, a quad-core processing core complex running four parallel decompression processes, each on a different core, may be more than 3 times faster than a single decompression process running on the quad-core processing complex. Further, by generating the metadata, storage and rendering of self-describing bulk data (e.g., tabular data), may be available to a wide variety of applications.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, the current embodiments may be implemented by one or more computer-processors that implement one or more machine-readable instructions stored on a tangible, non-transitory, machine-readable medium and/or by specialized circuitry designed to implement the discussed features.

The information age has brought about rapid advancements in telecommunication, hardware-based computing, software, and other data related activities. Thus, the current information-based society has resulted in the generation of a vast amount of valuable digital resources with more and more data consumption by customers, vendors, and electronic devices. For example, many organizations may retain a significant amount of analytics data within the organizations for use in business intelligence and other statistical analysis functions. Data collection has and will continue to exponentially increase. Unfortunately, as more data is collected, storage requirements grow exponentially, overwhelming available storage capacity. Further, as the data is increasingly relied upon for business intelligence and other analytical functions, rapid access is beneficial. It is now recognized that pre-processing of data may delay access to such data. Additionally, as statistical analysis becomes more wide-spread, it may be desirable to enable a multitude of statistical analysis engines to access data payloads. However, traditional statistical analysis data files may only be interpretable by a single statistical analysis engine.

Figure 1:
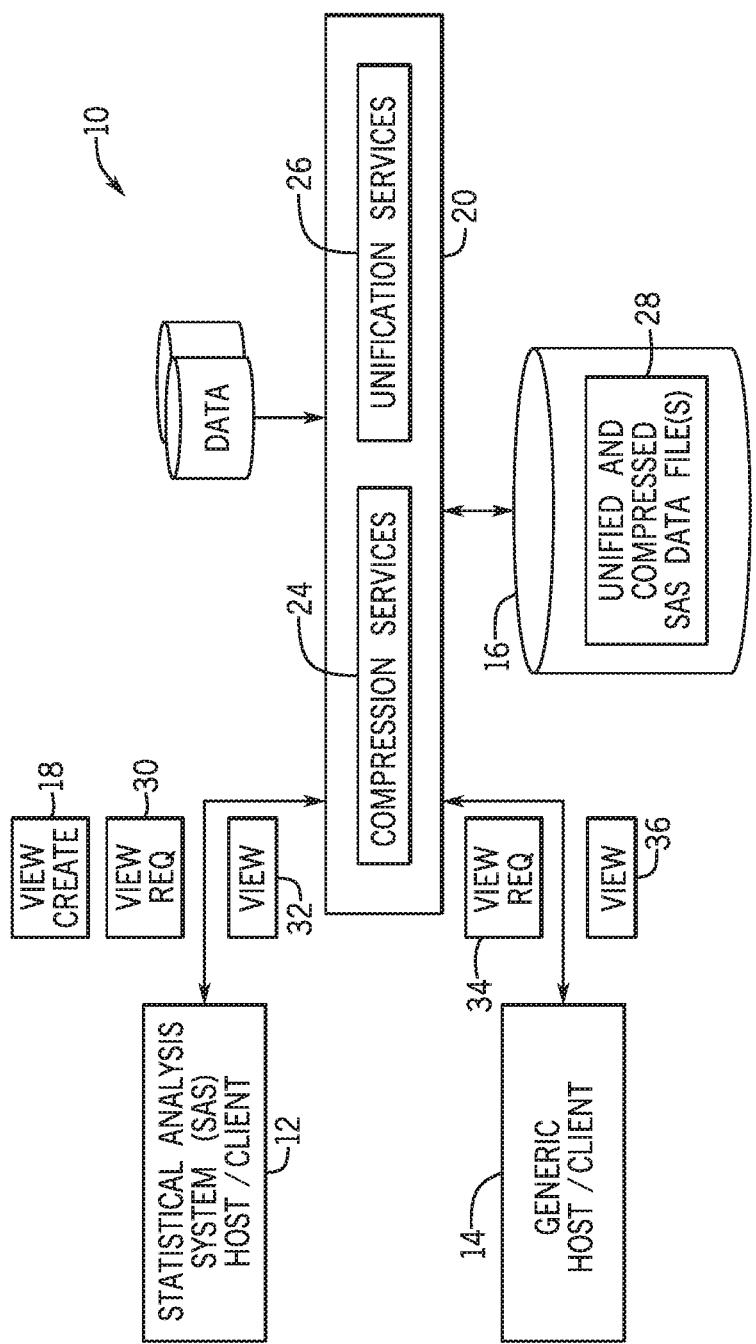
FIG. 1 illustrates a schematic diagram of a unification and compression system, in accordance with certain embodiments described herein.

Accordingly, as discussed above, new techniques may be implemented to efficiently store and use data analysis tools, such as statistical analysis system (SAS) tools. By way of introduction, FIG. 1 illustrates a schematic diagram of a unification and compression system 10, in accordance with certain embodiments described herein. The system 10 may include one or more statistical analysis system (SAS) hosts and/or clients 12 and or one or more generic hosts and/or clients 14 that perform statistical analysis functions in an SAS-incompatible manner. SAS® is a system that may obtain a data payload from a variety of different sources and mine, alter, and/or otherwise manage the data payload, resulting in high-powered analytics of the payload data. For example, an SAS® data step view is a type of SAS® data set that obtains external payload data, using descriptor information, such as the data types and lengths of the variables of the payload, plus payload retrieval information.

The SAS® host/client 12 may generate a SAS® data step view and request that the SAS® data step view be stored in a data store 16 (a tangible, non-transitory, machine-readable medium) by executing a view creation request 18 (e.g., executing a macro that is interpretable by the SAS® host/ client 12 via the SAS® host/client 12). Upon invocation of such a request 18, the storage and use service 20 may implement a generalization service 22 that stores metadata indicating the variable characteristics that may be used to render the payload data in a generic format for non-SAS® (e.g., "generic") hosts/clients 14 (e.g., hosts/clients that do not run SAS® Software.

Further, as mentioned above, the data payload may include a vast amount of data that may rapidly deplete storage capacity of the data store 16. Accordingly, compression services 24 may compress the payload for efficient storage of the payload data, such that storage capacity of the data store 16 may be less depleted upon saving the view and associated data payload to the data store 16.

Additionally, because SAS® data step views utilize external data files, the SAS® data step views may only be valid when the data files are present and accessible. Unfortunately, there are few mechanisms to ensure that the SAS® data step views are located with their corresponding payload data files. Accordingly, unification services 26 may append the metadata, the SAS® data step view, and the payload into a single unified file, such that the SAS® data step view, the data payload, and the metadata are all bound together, reducing the ability to move the SAS® data step view, the data payload, and/or the metadata without the other pieces of the SAS® data step view, the data payload, and/or the metadata.

As illustrated, the output of the services 20 may be a unified and compressed SAS® data file 28. As will be discussed in more detail below, the unified and compressed SAS® data file 28 may be a single file that includes: the SAS® data step view, the compressed payload data associated with the SAS® data step view, and metadata that may be used by the generic host/client 14 to construct a generic (e.g., non-SAS) view of the payload data.

For example, the SAS® host/client 12 may access the unified and compressed SAS® data file 28 by providing a view request 30 to open the view 32. As will be discussed in more detail below, the request 30 may trigger automatic decompression of the payload data, such that it may be used in conjunction with the SAS® data step view.

Similarly, the generic host/client 14 may access the unified and compressed SAS® data file 28 by providing a view request 34 to open or otherwise access the unified and compressed SAS® data file 28. As will be discussed in more detail below, the request 34 may trigger automatic decompression of the payload data, such that it may be used in conjunction with the metadata to reconstruct a generic view 36 that is interpretable by the generic host/client 14.

Figure 2:
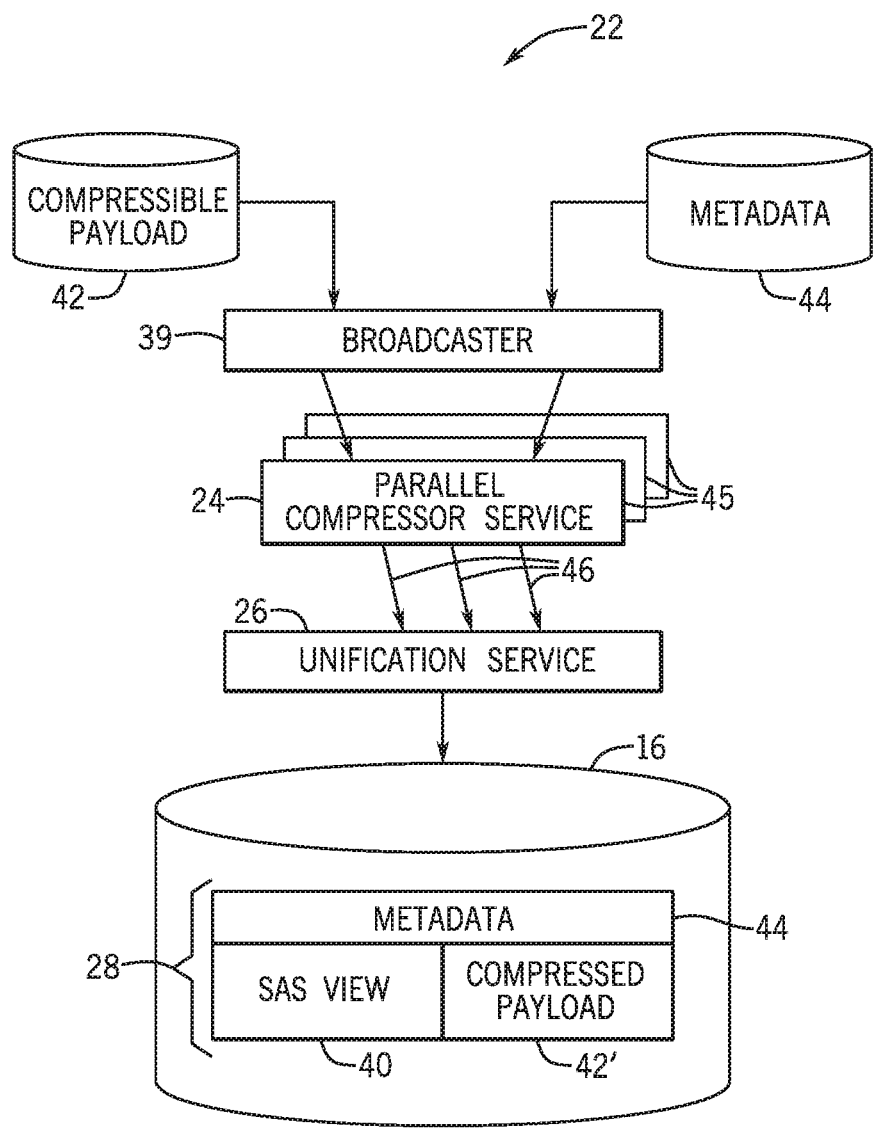
FIG. 2 illustrates a schematic diagram of the unification services of the system of FIG. 1, in accordance with certain embodiments described herein.
Figure 3:
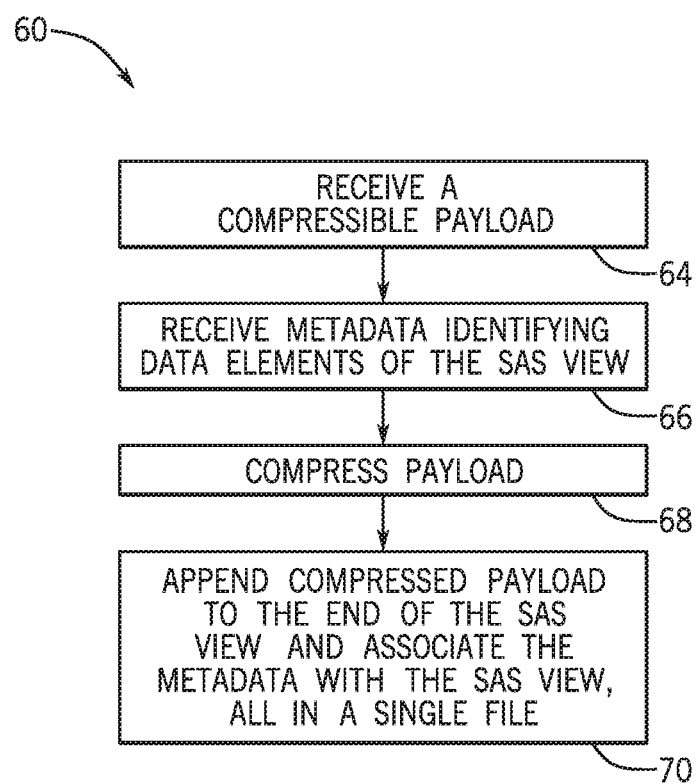
FIG. 3 illustrates a flowchart of a unification process, in accordance with certain embodiments described herein.

FIG. 2 illustrates a schematic diagram of the services 20 of FIG. 1 using upon the compressible payload 42, and the metadata 44 to generate a self-expanding SAS® data step view, which renders the original data, in accordance with certain embodiments described herein. FIG. 3 illustrates a flowchart of a unification process 60, in accordance with certain embodiments described herein. FIGS. 2 and 3 will be discussed together. In some embodiments, the SAS® Software may be used implement one or more of the processing blocks of the process 60 and/or may implement one or more of the services of FIG. 2.

As illustrated, the generalization service 22 may receive the compressible payload 42 (block 64) as input and also may receive metadata 44 (e.g., a table) relating to the variable characteristics of the SAS® data step view 40 (block 66). For example, the variable characteristics of the SAS® data step view 40 may include the names, types, lengths, formats, labels, etc. of the variables described in the SAS® data step view 40.

Further, the compressible payload 42 and the metadata 44 may be published by a broadcaster service 39 to the compression service 24 (e.g., parallel compression service) to compress the payload (block 68). For example, the compression service 24, which may be hosted on a multi-core processor complex, may divide the compressible payload data 42 into divisions or blocks of data. These blocks may be compressed in parallel by multiple compression functions 45 implemented on the processors of the multi-core processor complex. For example, in some embodiments, four compression functions 45 may run individually on independent cores of a quad-core processor complex. In some embodiments, a single core may implement multiple instances of the compression functions. By implementing parallel compression, the compression processing time of the, oftentimes expansive, payload data may be greatly reduced. For example, by implementing four parallel compression functions 45 on a quad core processor, the compression processing time may be over three times as fast as a single compression processing function.

Any number of separate compression functions may run in parallel. For example, a server may have one board with two quad-core processors. Each core may run in hyper-threaded mode, causing it to appear as two processors to an operating system of the server. This may yield about 40% more throughput under Linux than running the same core as a serial processor. In this example, the server has 1 board with 2 chips/board×4 cores/chip×2 logical CPUs/core=16 logical CPUs. Thus, to maximize compression parallelism, 16 parallel compression functions may be implemented to support multiple simultaneous uses. Further, as CPU breadth increases, so may the number of parallel compression functions.

As illustrated by the multiple arrows 46, the multiple compression functions 45 may yield compressed blocks of data. The blocks are then reassembled after the compression function is complete (e.g., by the unification service 26), resulting in compressed payload data 42'.

For example, the unification service 26 may generate a unified and compressed file 28 that includes the SAS® data step view 40, the metadata 44, and the combined blocks or segments of compressed data 42'. In one embodiment, the unification service 26 may append the compressed payload data 42' to the end of the SAS® data step view 40 and associate the metadata 44 with the SAS® data step view 40 and/or the appended compressed payload data 42' (block 70). As will be discussed in more detail below, because of particular features of the SAS® host/client 12, the appending of the compressed payload data 42' to the SAS® data step view 40 will not affect the ability of the SAS® host/client 12 to access/execute the SAS® data step view 40. Thus, a single unified and compressed output file 28 may be generated by the unification service 26 and stored in the data store 16.

Figure 4:
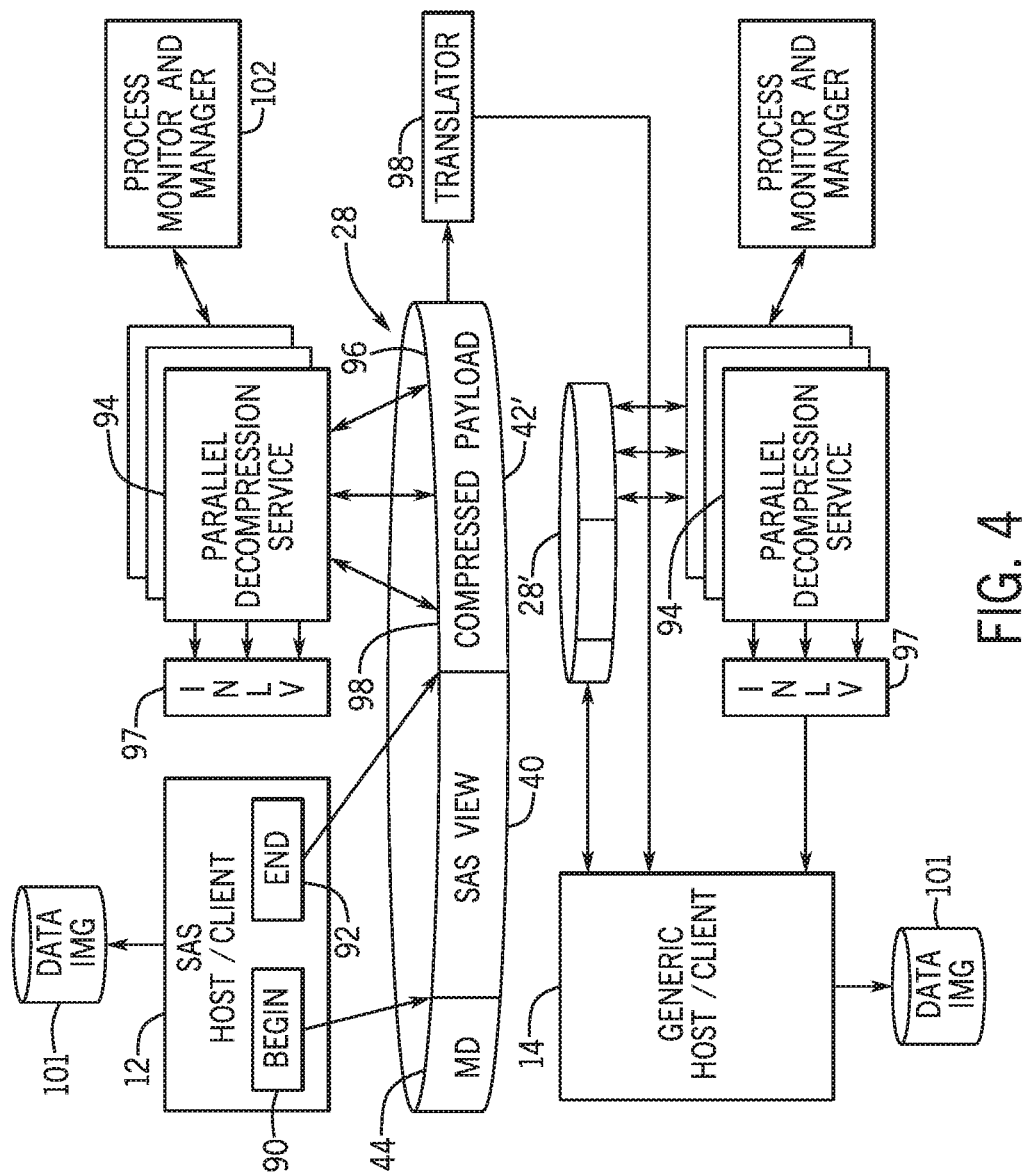
FIG. 4 illustrates a schematic view of use of a unified and compressed SAS® data step view file, in accordance with certain embodiments.

Turning now to the usage of the unified and compressed SAS® file, FIG. 4 illustrates a schematic view of use of a unified and compressed SAS® data step view file 28, in accordance with certain embodiments. As illustrated, the unified and compressed SAS® data step view file 28 includes metadata 44 (here as a file 28 header), the SAS® data step view 40, and compressed payload 42'. As previously mentioned, the compressed payload 42' is appended to the SAS® data step view 40, but does not impact the ability of the SAS® host/client 12's ability to access the SAS® data step view 40. The reason for this is that the SAS® host 12 includes a beginning pointer 90 that indicates a location (e.g., a memory location of the file 28) where the SAS® data step view 40 begins, as well as a end pointer 92 that indicates a location (e.g., a memory location of the file 28) where the SAS® data step view 40 ends. Accordingly, the SAS® host/client 12 does not extend beyond these pointers 90 and 92.

When the SAS® host/client 12 and/or the generic host/client 14 attempts to access the unified and compressed SAS® data step view file 28, the compressed payload 42' may be decompressed by the parallel compression service 94. The compressed payload 42' may be divided into portions 96. Similar to the compression discussed above, the portions 96 are decompressed in parallel (e.g., via separate decompression functions running on separate processor cores of a multi-core processor complex). Upon decompression of the portions 96, the decompressed payload data may be interleaved by an interleaver 97, such that the decompressed data is merged. The merged decompressed payload data may be used by the SAS® host/client 12, the generic host/client 14 and/or the SAS® data step view 40, resulting in an expected image of data 101.

Because the SAS® host/client 12 is a system running SAS® software, the SAS® host/client 12 is able to access the SAS® data step view 40 in a native format of the file 28. However, because the SAS® data step view 40 is interpretable by the SAS® software and the generic host/client 14 is not running SAS® software, a translator 98 may utilize the metadata 44 in conjunction with the SAS® data step view 40 and the payload 42 to construct a generic view 36 (e.g., a self-expanding rendition, such as a modified unified and compressed file 28') that is interpretable by the generic host/client 14, using the single unified and compressed SAS® data step view file 28.

In some embodiments, a process monitoring and management service 102 may monitor the decompression services 94. From time to time, these decompression services may not shut down properly (e.g., UNIX zombie processes). Accordingly, the process monitoring and management service 102 may monitor improperly shut down decompression processes and remove execution of these decompression services 94.

Figure 5:
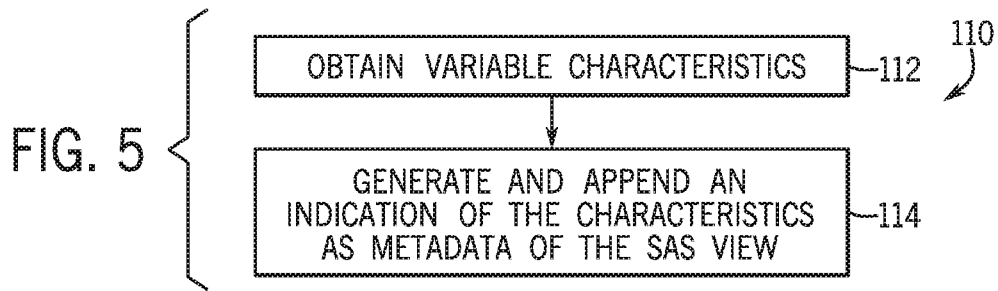
FIG. 5 illustrates a flowchart describing a process for creating metadata useful for reconstructing data in a manner interpretable by a generic host and/or client, in accordance with certain embodiments.

FIG. 5 illustrates a flowchart describing a process 110 for applying metadata 44 to the files 28 and 28', such that useful for reconstructing payload data in a manner interpretable by a generic host and/or client 14 of FIG. 4, in accordance with certain embodiments. To generate the metadata 44 of FIG. 4, variable characteristics of the SAS® data step view 40 are obtained (block 112). For example, the names of the view 40 variables, the types of the view 40 variables, the length of the view 40 variables, the format of the view 40 variables, and/or labels associated with the view 40 variables may be obtained via the analysis. Once the variable characteristics are obtained, an indication of the characteristics is generated and appended as metadata 44 to the unified and compressed SAS® data step view file 28 of FIG. 4, resulting in the unified and compressed SAS® data step view file 28 including a description of the variables of the SAS® data step view 40 that may be used to generate a generic view 36 for the generic host/client 14.

Figure 6:
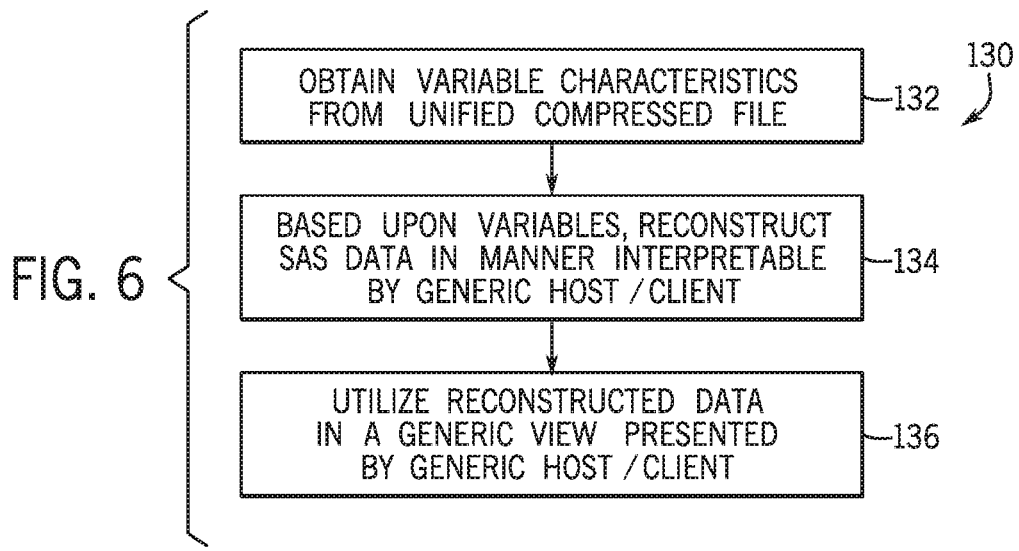
FIG. 6 illustrates a flowchart describing a process for using the reconstructed data created by the process of FIG. 5, in accordance with certain embodiments.

FIG. 6 illustrates a flowchart describing a process 130 for using the metadata 44 of FIG. 4 to reconstruct an SAS® data step view 40 in a generic form, in accordance with certain embodiments. The process 130 begins with reading or otherwise obtaining the variable characteristics mentioned above in FIG. 5 from the metadata 44 of the unified and compressed SAS® data step view file 28 of FIG. 4 (block 132). For example, these characteristics may be read from a header of the file 28, in some embodiments.

Based upon these variables and/or attributes of the variables, the payload data may be reconstructed in a manner interpretable by the generic host/client 14 of FIG. 4 (block 134). For example, a generic object model may be constructed using the variables and/or variable attributes, where the generic object model is in a format that is expected by the generic host/client 14.

The payload data, reconstructed in the generic host/client interpretable form, may then be utilized by the generic host/client 14 (block 136). For example the generic host/client 14 may access a generic object model that is in an expected format of the generic host/client 14, such that the variables and/or variable attributes may be used by the generic host/client 14 in a generic view 36.

Figure 7:
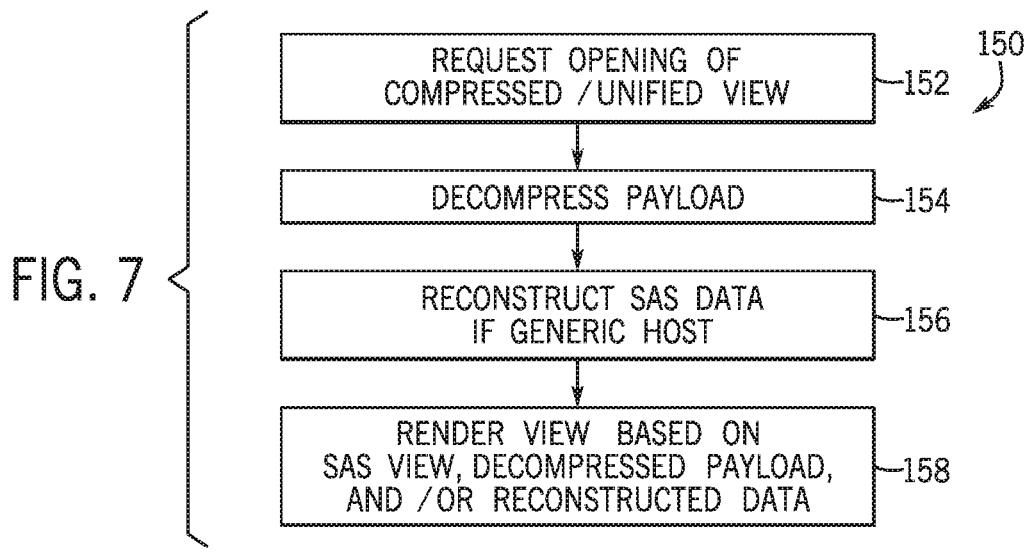
FIG. 7 illustrates a flowchart describing a process for using the unified and compressed SAS® data step view files, in accordance with certain embodiments.

Turning now to a discussion of rendering a view via the SAS® host/client 12 of FIG. 4 and/or the Generic host/client 14 of FIG. 4, FIG. 7 illustrates a flowchart describing a process 150 for using the unified and compressed SAS® data step view files 28 of FIG. 4, in accordance with certain embodiments. The process 150 begins by requesting access to (e.g., opening) the unified and compressed SAS® data step view file 28 of FIG. 4 (block 152). For example, a viewer application of the SAS® host/client 12 and/or the generic host/client 14 may access the file 28.

Upon access of the file 28 by the SAS® host/client 12 and/or the generic host/client 14, the compressed payload 42' of the file 28 of FIG. 4 may be decompressed (block 154). For example, as mentioned above, the compressed payload 42' may be parsed into portions 96 and decompressed in parallel. In one embodiment, the portions 96 are sent to separate decompression functions running in parallel on a multi-core processor complex, such that the processing functions run in parallel according to independent processor capacities. Any number of separate decompression functions may run in parallel. For example, a server may have one board with two quad-core processors. Each core may run in hyper-threaded mode, causing it to appear as two processors to an operating system of the server. This may yield about 40% more throughput under Linux than running the same core as a serial processor. In this example, the server has 1 board with 2 chips/board×4 cores/chip×2 logical CPUs/core=16 logical CPUs. Thus, to maximize decompression parallelism, 16 parallel decompression functions may be implemented. Further, as CPU breadth increases, so may the number of parallel decompression functions. Once the portions 96 are decompressed, they are merged back together, forming decompressed payload data.

As mentioned above, when the generic host/client 14 of FIG. 4 accesses the file 28, the SAS® data step view 40 data is reconstructed into a format interpretable by the generic host/client 14 (block 156). For example, a translator may construct a data stream that is interpretable by the generic host/client 14, based upon the metadata 44, the SAS® data step view 40, and the payload 42 of FIG. 4, all of which may be found in the unified and compressed file 28. Alternatively, when the SAS® host/client 12 is used, the SAS® data step view 40 may be rendered by the SAS® software of SAS® host/client 12.

A view may then be rendered based upon the SAS® data step view 40, the decompressed payload 42, and/or the reconstructed payload data of block 156 (block 158). For example, the generic object model constructed in block 156, the SAS® data step view 40 of FIG. 4, or both may point the decompressed payload data 42 to populate data for the SAS® data step view 40 and/or generic view rendered to the SAS® host/client 12 and/or generic host/client 14. For example, the SAS® data step view 40 and/or generic view may pipe a stream of data for subsequent statistical analysis and/or reporting by downstream applications of the hosts/clients.

The piped stream of data may have many applications. In certain embodiments, full-size data tables, such as SAS® data files, may be replaced with like-named SAS® data step views, such that users and existing programs accustomed to using particular tables utilize the view instead. Such implementation may be required little to no front-end changes to software and/or retraining of software users. In some embodiments, when storage capacity reached a low threshold, the full-sized tables may be automatically replaced with the like-named views, freeing up additional storage. Alternatively, in some embodiments, the replacement may be automated or otherwise triggered without a low threshold (e.g., as part of a comprehensive space-management program for storage of such tables).

As may be appreciated, by applying the current techniques, SAS® data may be easily accessed, while increasing processing efficiencies, increasing storage capacity, and creating mechanisms for generic hosts/clients to make use of bulk payload data. Thus data storage costs may be reduced, while workforce throughput may increase. By implementing these techniques as SAS® data step views are accessed, the compression/decompression of the SAS® payload data may have relatively little impact on the graphical user interface experience of opening SAS® data step views, while offering significant performance and/or storage capacity improvement.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A tangible, non-transitory, machine-readable medium, comprising machine-readable instructions to:
    receive a request to open compressed statistical analysis system (SAS) data, the compressed SAS data comprising:
        an SAS data step view; and
        compressed payload data to be used in the SAS data step view when decompressed; and
    upon receiving the request, automatically decompress the compressed payload data, such that compressed payload data is decompressed and usable with the SAS data step view to render the SAS data step view and decompressed payload data on an electronic display of a client or host providing the request.

2. The machine-readable medium of claim 1, comprising instructions to automatically decompress the compressed payload data by:
    dividing the compressed payload data into a plurality of compressed payload portions;
    decompressing the plurality of compressed payload portions in parallel via a plurality of decompression functions running in parallel, resulting in a plurality of decompressed payload portions; and
    merging the plurality of decompressed payload portions to generate a full set of the decompressed payload data.

3. The machine-readable medium of claim 2, comprising instructions to:
    merge the plurality of decompressed payload portions via an interleaver.

4. The machine-readable medium of claim 2, comprising instructions to:
    run each decompression function of the plurality of decompression functions on a separate processing core of a multi-core processor complex.

5. The machine-readable medium of claim 2, comprising instructions to:
    terminate execution of at least one decompression function of the plurality of decompression functions that is improperly shut down.

6. The machine-readable medium of claim 1, comprising instructions to generate the compressed payload data by:
    dividing uncompressed payload data into a plurality of uncompressed payload portions;
    compressing the plurality of uncompressed payload portions in parallel via a plurality of compression functions running in parallel, resulting in a plurality of compressed payload portions; and
    merging the plurality of compressed payload portions to generate a full set of the compressed payload data.

7. The machine-readable medium of claim 6, comprising instructions to:

run each compression function of the plurality of compression functions on a separate processing core of a multi-core processor complex.

8. The machine-readable medium of claim 1, wherein the compressed SAS data is configured to be unified with a set of metadata describing characteristics of variables of the SAS data step view.

9. A computer-implemented method, comprising:
   requesting opening of compressed statistical analysis system (SAS) data, wherein the compressed SAS data comprises:
   an SAS data step view; and
   compressed payload data to be used in the SAS data step view when decompressed, wherein requesting opening of the compressed SAS data automatically triggers decompression of the compressed payload data to generate a full set of decompressed payload data; and
   rendering the SAS data step view using the decompressed payload data on an electronic display.

10. The computer-implemented method of claim 9, comprising:
    when a computer implementing the computer-implemented method is not a SAS host or a SAS client, constructing a generic object model that is interpretable by the computer.

11. The computer-implemented method of claim 10, comprising:
    rendering the SAS data step view on the electronic display using the generic object model.

12. The computer-implemented method of claim 10, comprising:
    constructing a data stream that is interpretable by the SAS host or the SAS client via a translator function.

13. The computer-implemented method of claim 9, comprising:
    when a computer implementing the computer-implemented method is a SAS host or a SAS client, rendering the SAS data step view on the electronic display via SAS software of the computer.

14. The computer-implemented method of claim 9, comprising decompressing the compressed payload data by:
    parsing the compressed payload data into a plurality of compressed payload portions;
    decompressing the plurality of compressed payload portions in parallel via a plurality of decompression functions running in parallel to generate a plurality of decompressed payload portions; and
    merging the plurality of decompressed payload portions to generate the full set of the decompressed payload data.

15. The computer-implemented method of claim 9, comprising generating the compressed payload data by:
    parsing uncompressed payload data into a plurality of uncompressed payload portions;
    compressing the plurality of uncompressed payload portions in parallel via a plurality of compression functions running in parallel to generate a plurality of compressed payload portions; and
    merging the plurality of compressed payload portions to generate a full set of the compressed payload data.

16. A computer-implemented method, comprising:
    receiving a request to open compressed statistical analysis system (SAS) data, the compressed SAS data comprising:
    an SAS data step view; and
    compressed payload data to be used in the SAS data step view when decompressed; and
    upon receiving the request, automatically decompressing the compressed payload data, such that compressed payload data is decompressed and usable with the SAS data step view to render the SAS data step view and decompressed payload data on an electronic display of a client or host providing the request.

17. The computer-implemented method of claim 16, wherein the decompressing comprises:
    dividing the compressed payload data into a plurality of portions of compressed payload data;
    decompressing the plurality of portions of compressed payload data in parallel via a plurality of decompression functions running in parallel, resulting in a plurality of portions of decompressed payload data; and
    merging the plurality of portions of decompressed payload data, resulting in a complete set of the decompressed payload data.

18. The computer-implemented method of claim 17, wherein:
    the plurality of decompression functions are each running on respective processing cores of a multi-core processor complex.

19. The computer-implemented method of claim 18, wherein:
    the respective processing cores of the multi-core processor complex are each operated in a hyper-threaded mode.

20. The computer-implemented method of claim 16, comprising generating the compressed payload data by:
    dividing uncompressed payload data into a plurality of uncompressed payload portions;
    compressing the plurality of uncompressed payload portions in parallel via a plurality of compression functions running in parallel, resulting in a plurality of compressed payload portions; and
    merging the plurality of compressed payload portions to generate a complete set of the compressed payload data.

* * * * *